UNITED STATES PATENT OFFICE.

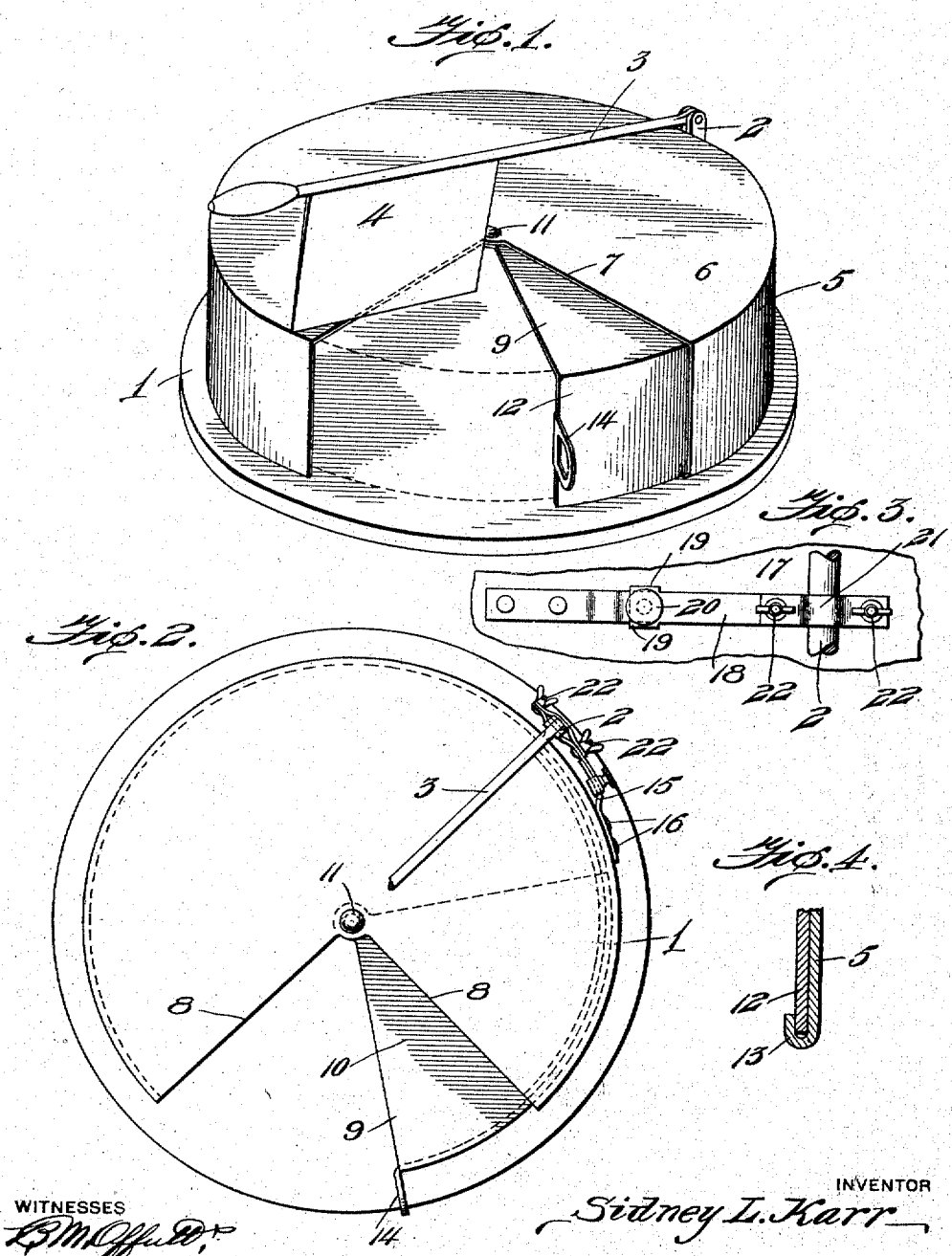

SIDNEY L. KARR, OF GALT, CALIFORNIA.

CHEESE-COVER.

1,254,406.  Specification of Letters Patent.  Patented Jan. 22, 1918.

Application filed May 9, 1916. Serial No. 96,398.

*To all whom it may concern:*

Be it known that I, SIDNEY L. KARR, a citizen of the United States, residing at Galt, in the county of Sacramento and State of California, have invented certain new and useful Improvements in Cheese-Covers, of which the following is a specification.

This invention has relation to covers for cheese cutters, and the nature and objects thereof will be readily apparent to those skilled in the art to which it appertains, in the light of the following explanation, of the accompanying drawings, illustrating what I now believe to be the preferred embodiment or mechanical expression of my invention from among other forms and arrangements within the spirit of the invention, or the scope of the appended claim.

However, an object of the invention is to provide a substantially cylindrical cover, to be placed over a cheese which may be supported upon one of the numerous forms of cheese cutters now obtainable on the market, so as to exclude flies, mice and other vermin from the cheese.

Another object of the invention is to provide a cover of the character described having a segmental lateral opening therein, exposing a portion of the cheese from which slices may be severed, said cover also having a closure for closing the segmental opening when cheese is not to be dispensed.

In addition to the foregoing, my invention comprehends improvements in the details of construction and arrangement of parts, to be hereinafter described and particularly pointed out in the appended claims.

In the accompanying drawings in which similar and corresponding parts are designated by the same characters of reference throughout the several views in, which they appear:—

Figure 1 is a view in perspective of my improved cover and illustrating its application to a cheese cutter of conventional type.

Fig. 2 is a view in plan of the cover and cheese cutter.

Fig. 3 is a detail view illustrating the manner in which the cover is secured to a stationary part of the cheese cutter to preclude displacement of the cover, and Fig. 4 is a detail section through the lower portion of the cover and closure.

With reference to the drawings, 1 indicates a circular base, of a cheese cutter, which is provided at its edge with a vertical standard 2, having its upper extremity bifurcated to support in pivotal relation the end of a knife bar 3, which is adapted to be moved from a vertical to a horizontal position diametrically across the base, and is provided with a knife 4. In some cheese cutters a horizontally rotatable platform is pivoted to the base, and the cheese is then supported upon the platform. The cheese cutter however does not form a part of this invention, and for the purpose of illustration, the cheese may be supported upon the base 1, and rotated in any manner desired, in order to bring the same in position beneath the knife 4 to cut a slice of the required size.

My invention comprises in its essentials, a cylindrical cover 5, closed at the top as indicated at 6, and open at the bottom so that it may be superposed upon a cheese, to house the cheese therewithin, with the lower edge of the cover resting upon the base. A segmental cut away portion 7 is provided in the top of the cover, and the sides thereof, said cut away portion, or opening having an angular extent of approximately 45°. The sides 8 of the cut away portion in the cover are disposed radially as shown in Fig. 2 of the drawings.

A closure 9 is provided for the cut away portion, and is substantially segmental in conformation, comprising a horizontal segmental portion 10 pivotally connected to the top of the cover at the exact center thereof by means of a rivet 11, and having an arcuate vertical portion 12 conforming in curvature to the side 5 of the cover. The closure member is contained entirely within the cover member, and the lower edge of the closure is guided for movement in an upturned lower edge 13 of the side member 5 of the cover, shown in detail in Fig. 4. Thus it will be seen that the closure 9 may be rotated so as to entirely close the segmental cut away portion of the cover member, to exclude the cheese from the attack of flies, mice and other vermin. A handle 14 is formed on one edge of the closure to facilitate the movement thereof. The cover it will be noted, does not interfere in any way with the dispensing of the cheese, as the blade 4, is movable in close relation to one of the sides 8 of the cut away portion, and the blade can descend into said cut away portion for the purpose of severing the cheese. The edge of the segmental cut away portion moreover may serve as a guide when the cheese is rotated to indicate the dimension of the slice to be removed.

For securing the cover against displacement, a metallic strip 15 is secured at one end by means of rivets 16 to the sides of the cover, and having its free end slightly spaced from the side, to receive one end of a clamping member designated generally 17, and comprising a relatively long strip 18, formed at one end with lateral ears 19 which are adapted to be bent around the free end of the strip 15. A set screw 20 is mounted at the end of the strip 18 for engaging the strip 15 to preclude relative displacement of the strips subsequent to adjustment. The outer end of the strip 18 is provided with a relatively short strip 21, spaced from the strip 18 to engage the standard 2 therebetween. Thumb nuts and screws 22 are provided for securing together the strips of the clamping member at opposite sides of the standard. By means of this adjustable clamp, the cover may be attached to cheese cutters of various types, and the clamp suitably adjusted to engage the knife standard thereof.

While I have illustrated and described my invention with some degree of particularity, I realize that in practice various alterations thereover may be made for the purpose of employing the principles therein presented and I therefore reserve the right and privilege of changing the form of the details of construction and altering the arrangement of the parts, without departing from the spirit of the invention, or the scope of the appended claims.

Having thus fully described my invention what I claim as new and desire to secure by Letters Patent is:—

The combination with a cheese cutter including a base, a standard, and a knife bar pivoted to the standard of a cheese cover in the form of a cylindrical inverted container adapted to cover a cheese supported on the base, a segmental opening provided in the side of the cover, a pivoted segmental closure adapted to close the opening, and a clamp for securing the cover against displacement comprising a member engageable upon the standard, a member secured to the cover, and means for adjustably connecting the last two named members.

In testimony whereof I affix my signature in presence of two witnesses.

SIDNEY L. KARR.

Witnesses:
W. B. SAWYER,
J. E. LICKS.